March 10, 1936.  H. T. BOOTH  2,033,110
COMBINED PRESSURE AND VISCOSITY INDICATOR
Filed Feb. 7, 1933
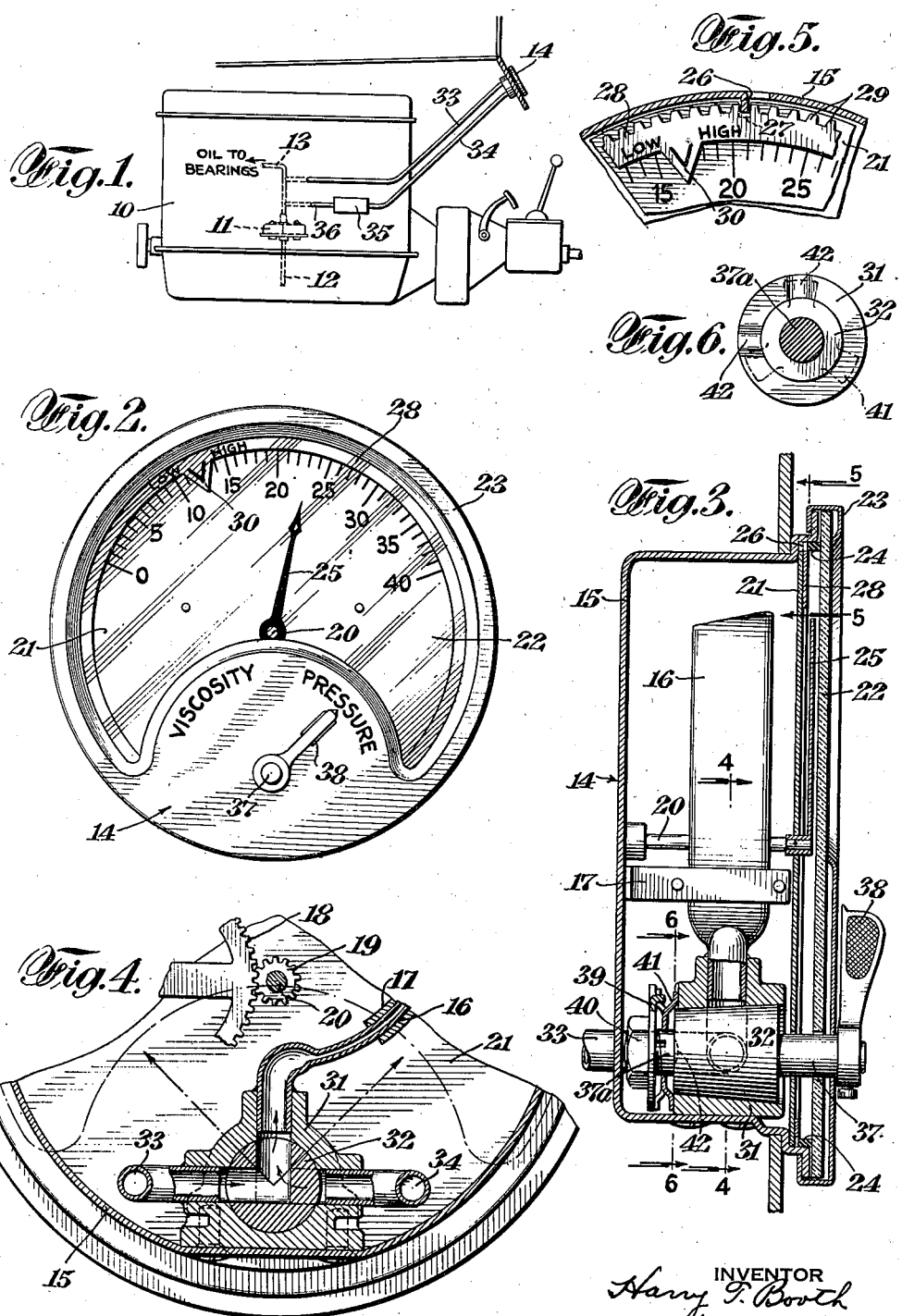
INVENTOR
Harry T. Booth
BY Kenyon & Kenyon
ATTORNEYS.

Patented Mar. 10, 1936

2,033,110

UNITED STATES PATENT OFFICE 2,033,110

COMBINED PRESSURE AND VISCOSITY INDICATOR

Harry T. Booth, Detroit, Mich., assignor to Lubrication Control Corporation, Chicago, Ill., a corporation of Delaware Application February 7, 1933, Serial No. 655,577

4 Claims. (Cl. 265—11)

This invention relates to indicators and has for an object a combined pressure and viscosity indicator suitable for use in connection with the lubricating system of an internal combustion engine or the like selectively to register the pressure or the viscosity of the lubricant in the system.

According to the invention, a pressure gauge is connected through a two-way valve with the bearing supply line and with a device responsive to viscosity variations in oil flowing through it to effect pressure variations of such oil, the gauge being connected to said device so as to be adapted to register the pressure variations and the device being connected to the bearing supply line. The gauge dial is provided with calibrations indicating a range of pressures and calibrations indicating a range of viscosity. By manipulation of the two-way valve, the gauge may be subjected to the pressure in the bearing supply line or to the pressure in the device and the position of the gauge pointer will give direct readings either of the pressure or the viscosity of the oil supplied to the bearings.

In a lubricating system embodying the invention, a single pressure gauge is used to register not only the pressure of the lubricant in the system, but also to register the viscosity of the lubricant, thereby saving the cost and the inconvenience of an additional gauge.

Other objects, novel features and advantages of this invention will be apparent from the following specification and accompanying drawing, wherein:

Fig. 1 is a side elevation of an automobile engine equipped with a lubricating system embodying the invention;

Fig. 2 is a front view of the gauge;

Fig. 3 is a vertical central section through the gauge;

Fig. 4 is a fragmentary section on the line 4—4 of Fig. 3;

Fig. 5 is a fragmentary section on the line 5—5 of Fig. 3, and

Fig. 6 is a section on the line 6—6 of Fig. 3.

The automobile engine 10 is provided with a lubricating system comprising a pump 11 which draws oil from the sump through a pipe 12 and delivers it to the bearings through a pipe 13. A pressure gauge 14 is mounted on the instrument board and comprises a casing 15 in which is provided a Bourdon tube 16, one end of which is rigidly supported by a bracket 17. The other end of the Bourdon tube is operatively associated with an oscillatable gear sector 18 in the well-known manner and the sector 18 meshes with a pinion 19 carried by a shaft 20. The shaft 20 extends through a dial 21 which is held against a shoulder by means of a glass cover 22 and bezel 23, there being a rubber ring 24 interposed between the dial and the glass cover. A pointer 25 is carried by the shaft 20 between the dial and glass cover. The dial is located in proper position by means of a tongue 26 turned in from the casing and received in a notch 27 in the dial. A ring 28 is arranged between the dial 21 and the rubber ring 24 and is provided with teeth 29 by engagement of which with the tongue 26 the ring may be locked in any desired position. The dial is calibrated to indicate the range of pressures and the ring is provided with a pointed projection 30 and is calibrated adjacent the projection to indicate a range of viscosities.

The fixed end of the Bourdon tube leads into a valve housing 31 arranged in the casing 15. A two-way valve 32 is rotatably mounted in the housing 31 and is adapted to establish communication between the Bourdon tube 16 and a pipe 33 leading to the supply line 13 or to establish communication between the Bourdon tube and a pipe 34 leading to a device 35 responsive to viscosity variations in oil flowing through it to effect pressure variations in said oil, this device being connected through the pipe 36 to the pipe 13. The device 35 is so connected to the pipe 34 that the pressure variations in the oil may be impressed on the Bourdon tube through the valve 32 when the latter is properly positioned. The valve 32 is provided with a stem 37 which projects through the dial and glass cover and is provided with an operating handle 38. The valve is also provided with a stem 37a to which is keyed a washer 39 which is held on the stem by a nut 40. A spring washer 41 is interposed between the washer 39 and the valve housing 31 and is provided with offset prongs, one of which is locked to the washer 39. The valve housing is provided with two depressions 42 into which one prong of the spring washer is adapted to seat in order to retain the valve in either of two positions, in one of which positions the pipe 33 is in communication with the Bourdon tube and in the other of which positions the pipe 34 is in communication with the Bourdon tube.

The ring 28 is arranged on the dial in such position that the pointer 25 will register with the projection 30 when the oil is of proper viscosity, the proper position having been determined in advance from the character of the oil to be used in the engine. The ring is made adjustable so that the gauge can be differently set for different types of oil.

Ordinarily, the valve 32 is maintained in the position shown in Fig. 4 with the pipe 33 in communication with the Bourdon tube so that the gauge registers the pressure in the lubricating system. When it is desired to determine the viscosity of the lubricant, the handle 38 is operated to turn the valve to bring the pipe 34 into communication with the Bourdon tube. The gauge will then register the pressure within the viscosity-responsive device 35 and as this pressure is a function of the viscosity, the position of the pointer 25 with respect to the calibrations on the ring 28 will indicate the viscosity of the oil. If the pointer registers with the projection 30 then the viscosity is proper, but if the pointer lies to the left or right of the projection then the viscosity is either too high or too low and warning is given that the viscosity should be corrected.

The device 35 may be any one of the types of such devices disclosed in applicant's following co-pending applications Serial Nos. 655,578; 655,579 and 655,580, or any other device in which viscosity variations in oil flowing through it effect pressure variations in the oil.

I claim:

1. In combination with the lubricating system of an engine or the like, a device connected to said system and responsive to viscosity variations in oil flowing through it to effect pressure variations in said oil, a pressure gauge, means for selectively connecting said gauge with said lubricating system or said device, said pressure gauge being provided with two sets of calibrations of which one indicates a range of viscosities.

2. In combination with the lubricating system of an engine or the like, a device connected to said system and responsive to viscosity variations in oil flowing through it to effect pressure variations in said oil, a gauge comprising a pressure responsive element, means for selectively connecting said pressure responsive element with the lubricating system or with said device, an indicator actuated by said element, and a dial associated with said indicator, said dial having two sets of calibrations of which one set indicates a range of viscosities.

3. In combination with the lubricating system of an engine or the like, a device connected to said system and responsive to viscosity variations in oil flowing through it to effect pressure variations in said oil, a gauge comprising a pressure responsive element, means comprising a two-way valve for connecting said element either with said system or with said device, an indicator actuated by said element, and a dial associated with said indicator, said dial having two sets of calibrations of which one set indicates a range of viscosities.

4. In combination with the lubricating system of an engine or the like, a device connected to said system and responsive to viscosity variations in oil flowing through it to effect pressure variations in said oil, a pressure responsive element, means for selectively connecting said element with said lubricating system or with said device, an indicator actuated by said element, a dial associated with said indicator and having calibrations indicating a range of pressures, and a ring associated with said dial, said ring being adjustable relative to the dial and having calibrations indicating a range of viscosity.

HARRY T. BOOTH.